United States Patent
Liu et al.

(10) Patent No.: US 12,443,528 B2
(45) Date of Patent: Oct. 14, 2025

(54) MEMORY MANAGEMENT CIRCUIT, ELECTRONIC DEVICE AND MEMORY MANAGEMENT METHOD

(71) Applicant: MEDIATEK INC., Hsin-Chu (TW)

(72) Inventors: Ying-Lin Liu, Hsinchu (TW); Chung-Lun Huang, Hsinchu (TW); Shih-Chang Lin, Hsinchu (TW); Yu-Cheng Lin, Hsinchu (TW); Lin Liu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/512,038

(22) Filed: Nov. 17, 2023

(65) Prior Publication Data
US 2025/0165401 A1    May 22, 2025

(51) Int. Cl.
    *G06F 12/0804*    (2016.01)
    *G06F 12/0873*    (2016.01)

(52) U.S. Cl.
    CPC ...... *G06F 12/0804* (2013.01); *G06F 12/0873* (2013.01)

(58) Field of Classification Search
    CPC .......... G06F 12/0804; G06F 12/0873
    See application file for complete search history.

(56) References Cited

U.S. PATENT DOCUMENTS

| | | | | |
|---|---|---|---|---|
| 2007/0274303 A1* | 11/2007 | Cui | ........ | G06F 12/023 |
| | | | | 370/363 |
| 2018/0232169 A1* | 8/2018 | Liang | ...... | G06F 3/0632 |
| 2020/0004460 A1* | 1/2020 | Gould | ...... | G06F 3/0613 |
| 2022/0164300 A1* | 5/2022 | Wu | ........ | G06F 12/0238 |
| 2023/0229324 A1* | 7/2023 | Zhou | ...... | G06F 3/0673 |
| | | | | 711/111 |

FOREIGN PATENT DOCUMENTS

| | | |
|---|---|---|
| CN | 107844431 A | 3/2018 |
| TW | 201935231 A | 9/2019 |

* cited by examiner

*Primary Examiner* — Prasith Thammavong
(74) *Attorney, Agent, or Firm* — Winston Hsu (57) ABSTRACT

A memory management circuit, an electronic device and a memory management method are provided. The memory management circuit includes a controller and an address mapping logic. The controller records addresses of available storage spaces within a memory device, wherein a searching logic of the controller stores the addresses in a storage device, and the addresses are queued with a specific order in the storage device. When a computing circuit send a storage request to request for a storage resource, the searching logic obtains at least one address queued in the storage device according to the specific order of the addresses queued in the storage device, to accordingly generate a mapping table, and the address mapping logic performs an address mapping operation upon the storage request according to the mapping table, to allow the computing circuit to utilize the available storage spaces according to the mapping table.

15 Claims, 4 Drawing Sheets

MEMORY MANAGEMENT CIRCUIT, ELECTRONIC DEVICE AND MEMORY MANAGEMENT METHOD

BACKGROUND

The present invention is related to memory management, and more particularly, to a memory management circuit, an electronic device (e.g. an electronic device comprising the memory management circuit) and a memory management method.

In a system for artificial intelligence (AI) data computation, a low-latency storage device may be arranged to minimize access time and power consumption, in order to achieve optimized power efficiency. In detail, separated empty spaces spread in the low-latency storage device may be searched and then put together by establishing a mapping table. According to this mapping table, a computing engine can utilizes the empty spaces spread in the low-latency storage device with continuous addresses. When there are multiple computing engines sharing one memory, the management of the storage spaces mentioned above becomes much more complicated. More particularly, time complexity of the above management may increase in response to a growth of a size of the memory.

Thus, there is a need for a novel method and associated architecture, which can reduce the time complexity of the memory management without introducing any side effect or in a way that is less likely to introduce side effects.

SUMMARY

An objective of the present invention is to provide a memory management circuit, an electronic device (e.g. an electronic device comprising the memory management circuit) and a memory management method, which can minimize a growth of time complexity of memory management operations of a memory due to a growth of a size of the memory.

At least one embodiment of the present invention provides a memory management circuit. The memory management circuit comprises a controller and an address mapping logic, wherein the address mapping logic is coupled to the controller. The controller is configured to record first addresses of available storage spaces within a first memory device, and control operations of generating a mapping table in response to a storage request of a computing circuit. The controller comprises a searching logic configured to store the first addresses in a storage device and generate the mapping table, wherein the first addresses are queued with a specific order in the storage device. When the computing circuit sends the storage request to request for a specific capacity of storage, the searching logic obtains at least one first address of the first addresses queued in the storage device according to the specific order of the first addresses queued in the storage device, to generate the mapping table according to the at least one first address obtained from the storage device. The address mapping logic is configured to perform an address mapping operation upon the storage request according to the mapping table, to allow the computing circuit to utilize at least a portion of the available storage spaces within the first memory device according to the mapping table.

At least one embodiment of the present invention provides an electronic device. The electronic device comprises a computing circuit, a memory device and a memory management circuit, wherein the memory management circuit is coupled to the computing circuit and the memory device. The computing circuit is configured to perform a computing operation, and the memory device is configured to provide available storage spaces for the computing circuit during the computing operation. The memory management circuit comprises a controller and an address mapping logic, wherein the address mapping logic is coupled to the controller. The controller is configured to record first addresses of the available storage spaces within the memory device, and control operations of generating a mapping table in response to a storage request of the computing circuit. The controller comprises a searching logic configured to store the first addresses in a storage device and generate the mapping table, wherein the first addresses are queued with a specific order in the storage device. When the computing circuit sends the storage request to request for a specific capacity of storage, the searching logic obtains at least one first address of the first addresses queued in the storage device according to the specific order of the first addresses queued in the storage device, to generate the mapping table according to the at least one first address obtained from the storage device. The address mapping logic is configured to perform an address mapping operation upon the storage request according to the mapping table, to allow the computing circuit to utilize at least a portion of the available storage spaces within the memory device according to the mapping table.

At least one embodiment of the present invention provides a memory management method, wherein the memory management method is applicable to a memory management circuit. The memory management method comprises: utilizing a controller of the memory management circuit to record first addresses of available storage spaces within a first memory device; utilizing a searching logic of the controller to store the first addresses in a storage device, wherein the first addresses are queued with a specific order in the storage device; in response to a computing circuit sending a storage request to request for a specific capacity of storage, utilizing the searching logic to obtain at least one first address of the first addresses queued in the storage device according to the specific order of the first addresses queued in the storage device, to generate a mapping table according to the at least one first address obtained from the storage device; and utilizing an address mapping logic of the memory management circuit to perform an address mapping operation upon the storage request according to the mapping table, to allow the computing circuit to utilize at least a portion of the available storage spaces within the first memory device according to the mapping table.

The memory management circuit, the electronic device and the memory management method provided by the embodiments of the present invention can queue the addresses of the available storage spaces with the specific order in a first in first out (FIFO) storage device after a space searching operation is completed, and the addresses may be output according to the specific order for establishing the mapping table without performing the space searching operation again. More particularly, with a data structure established in the FIFO, an searching operation of determining available addresses (which is arranged for establishing the mapping table) can be performed with a constant complexity such as O (1). In addition, the complexity of this searching operation will not increase even if available storage spaces of the TCM 121 becomes separated and irregular when time goes by. Thus, time complexity of establishing the mapping table will not be increased in response to the growth of the size of the memory.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
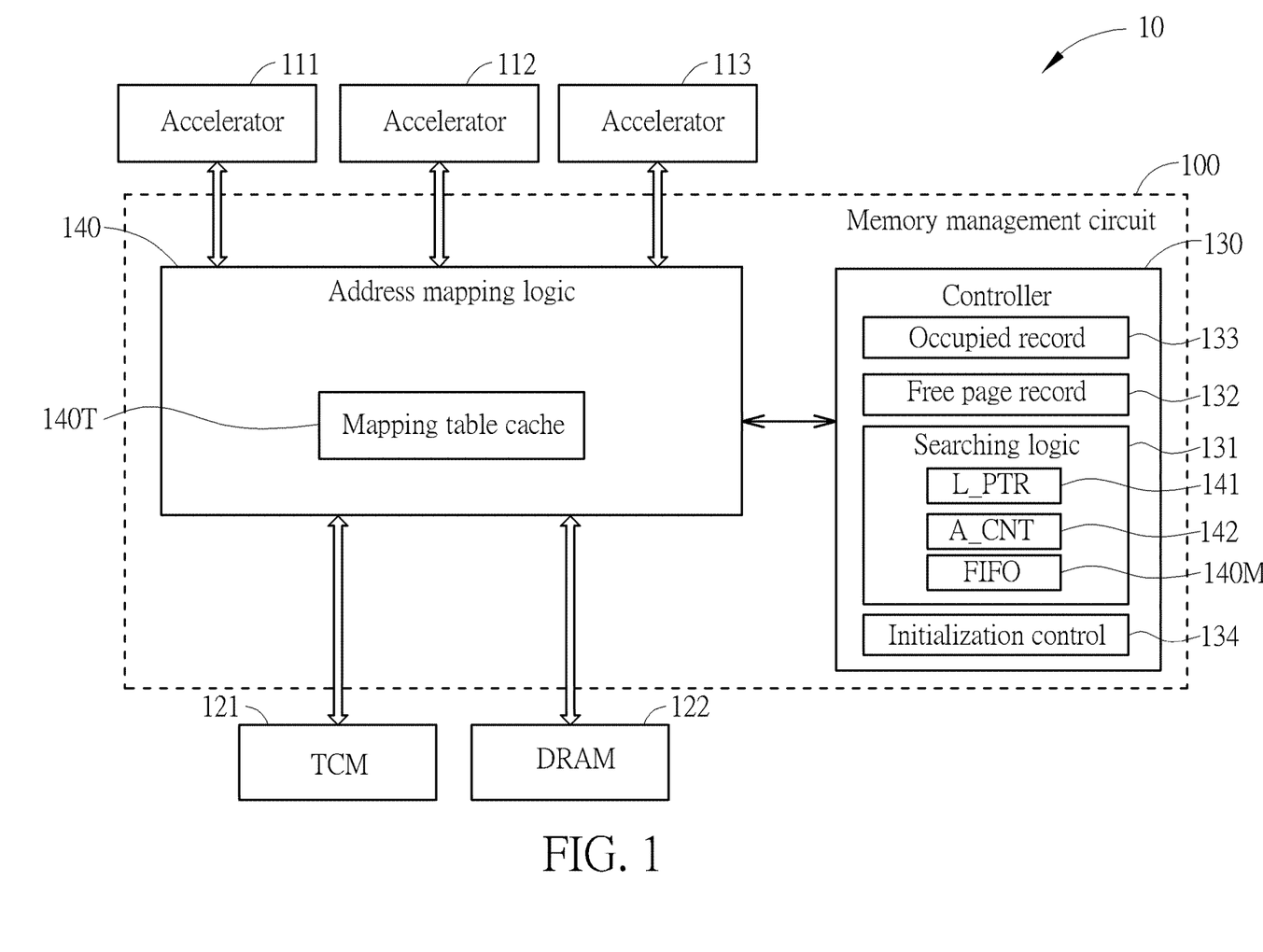
FIG. 1 is a diagram illustrating an electronic device according to an embodiment of the present invention.

FIG. 1 is a diagram illustrating an electronic device 10 such as an artificial intelligence (AI) related system according to an embodiment of the present invention. The electronic device 10 may comprise one or more computing circuits such as accelerators 111, 112 and 113 (e.g. AI accelerating circuits), one or more memory devices such as a tightly coupled memory (TCM) 121 and a dynamic random access memory (DRAM) 122, and a memory management circuit 100, wherein the memory management circuit 100 are coupled to the accelerators 111, 112 and 113, the TCM 121 and the DRAM 122. The TCM 121 may be implemented with a static random access memory (SRAM), but the present invention is not limited thereto. In this embodiment, each of the accelerators 111, 112 and 113 may be configured to perform a computing operation such as an AI related computing operation. The TCM 121 is configured to provide available storage spaces for any of the accelerators 111, 112 and 113 during the computing operation, and the DRAM 122 is configured to provide additional storage spaces when the available storage spaces provided by the TCM 121 are insufficient. Any of the accelerators 111, 112 and 113 may access any of the TCM 121 and the DRAM 122 through the memory management circuit 100, where speed of accessing the TCM 121 is much faster than speed of accessing the DRAM 122, and power consumption of accessing the TCM 121 is much less than power consumption of accessing the DRAM 122.

As shown in FIG. 1, the memory management circuit 100 may comprise a controller 130 and an address mapping logic 140 (e.g. an address mapping logic control circuit), where the address mapping logic 140 is coupled to the controller 130. The controller 130 is configured to record addresses of available storage spaces within the TCM 121 (referred to as "available TCM addresses" for brevity) and/or addresses of available storage spaces within the DRAM 122 (referred to as "available DRAM addresses" for brevity), and control operations of generating a mapping table in response to a storage request of a computing circuit (e.g. any of the accelerators 111, 112 and 113). The controller 130 may comprise a searching logic 131, where the searching logic 131 is configured to store the available TCM addresses and/or the available DRAM addresses in a storage device such as a first in first out (FIFO) storage device 140M (labeled "FIFO" in FIG. 1 for brevity), and accordingly generate the mapping table. More particularly, the first addresses may be queued with a specific order in the FIFO storage device 140M. In this embodiment, the FIFO storage device 140M may be included in the searching logic 131, but the present invention is not limited thereto. When the computing circuit (e.g. any of the accelerators 111, 112 and 113) sends the storage request to request for a specific capacity of storage, the searching logic 131 may obtain at least one address (e.g. at least one available TCM address and/or at least one available DRAM address) of the addresses (e.g. the available TCM addresses and/or the available DRAM addresses) queued in the FIFO storage device 140M according to the specific order of the addresses queued in the FIFO storage device 140M, to generate the mapping table according to the at least one address (e.g. at least one available TCM address and/or at least one available DRAM address) obtained from the FIFO storage device 140M. The address mapping logic 140 may comprise a storage device such as a mapping table cache 140T configured to store the mapping table generated by the searching logic 131, and the address mapping logic 140 is configured to perform an address mapping operation upon the storage request according to the mapping table, to allow the computing circuit (e.g. any of the accelerators 111, 112 and 113) to utilize at least a portion of the available storage spaces within the TCM 121 and/or the DRAM 122 according to the mapping table. For example, the mapping table may record a mapping relationship between at least one logical address (e.g. which may be visualized addresses that appear to be continuous for the computing circuit) and the at least one address (e.g. at least one available TCM address and/or at least one available DRAM address, which may be physical addresses correspond to separated storage locations in the TCM 121 and/or the DRAM 122) obtained from the FIFO storage device 140M, and the address mapping logic 140 is configured to perform the address mapping operation upon a logical address according to the mapping table, in order to redirect the logical address to a corresponding TCM address or a corresponding DRAM address.

As shown in FIG. 1, the controller 130 may further comprise an initialization control circuit 134 (labeled "Initialization control" in FIG. 1 for brevity), where the initialization control circuit 134 is configured to perform an initialization operation to determine the available storage spaces within the TCM 121 and/or the DRAM 122, and thereby record the addresses of the available storage spaces (e.g. the available TCM addresses and/or the available DRAM addresses) when the memory management circuit 100 is powered on, where the initialization control circuit 134 may control the searching logic to search for the available storage spaces within the TCM 121 and thereby record the available TCM addresses (i.e. the addresses of the available storage spaces within the TCM 121) when the memory management circuit 100 is powered on, and/or search for the available storage spaces within the DRAM 122 and thereby record the available DRAM addresses (i.e. the addresses of the available storage spaces within the DRAM 122) when the memory management circuit 100 is powered on. For example, the searching logic 131 may check states of all storage spaces within the TCM 121. When a state of a certain storage space of the TCM 121 indicates that this storage space is available (e.g. empty), the searching logic 131 may record an address of this storage space as an available TCM address. When a state of a certain storage space of the TCM 121 indicates that this storage space is occupied (e.g. having data stored therein), the searching logic 131 may record an address of this storage space as an occupied TCM address. Related details of searching operations applied to the DRAM for recording available DRAM addresses and occupied DRAM addresses may be deduced by analogy, and are omitted here for brevity. After the searching logic 131 completes the above searching operations, all available TCM addresses and/or at least a portion of the available DRAM addresses may be collected as a free page record 132 and all occupied TCM addresses and/or at least a portion of the available DRAM addresses may be collected as an occupied record 133. Thus, the searching logic 131 may receive the available TCM addresses recorded in the free page record 132, and the searching logic 131 may sequentially input the available TCM addresses to the FIFO storage device 140M, to make the available TCM addresses be queued with the specific order (e.g. an order of the available TCM addresses being input to the FIFO storage device 140M) in the FIFO storage device 140M. More particularly, the FIFO storage device 140M may comprises a plurality of storage units (e.g. registers), and the storage units are configured to store the available TCM addresses, respectively. In some embodiment, the searching logic 131 may further input a portion of the available DRAM addresses to the FIFO storage device 140M, and more particularly, to input these DRAM addresses following the available TCM addresses, making these DRAM addresses be queued after the available TCM addresses in the FIFO storage device 140M when the available TCM addresses is insufficient. In some embodiment, when the searching logic 131 determines that all storage spaces within the TCM 121 are occupied (e.g. there is no available TCM address), the searching logic 131 may input the available DRAM addresses to the FIFO storage device 140M, to make the available DRAM addresses be queued with the specific order. In some embodiment, the available DRAM addresses may be stored in a storage device other than the FIFO storage device 140M, and the searching logic 131 may obtained at least available DRAM address from this storage device when needed (e.g. when the available TCM address is insufficient for a certain task of the computing circuit), but the present invention is not limited thereto.

In this embodiment, the searching logic 131 may further comprises at least one register such as registers 141 and 142, wherein the register 141 is configured to store a pointer L_PTR (labeled "L_PTR" on the register 141 for better comprehension) which indicates a specific storage unit among the storage units of the FIFO storage device 140M, and the register 142 is configured to store a counting value A_CNT (labeled "A_CNT" on the register 142 for better comprehension) which indicates a number of the available TCM addresses that are available. The initialization control circuit 134 may initialize the pointer L_PTR and the counting value A_CNT during the initialization operation for subsequent usage. Details related to the above parameters (e.g. the pointer L_PTR and the counting value A_CNT) will be described later.

Figure 2:
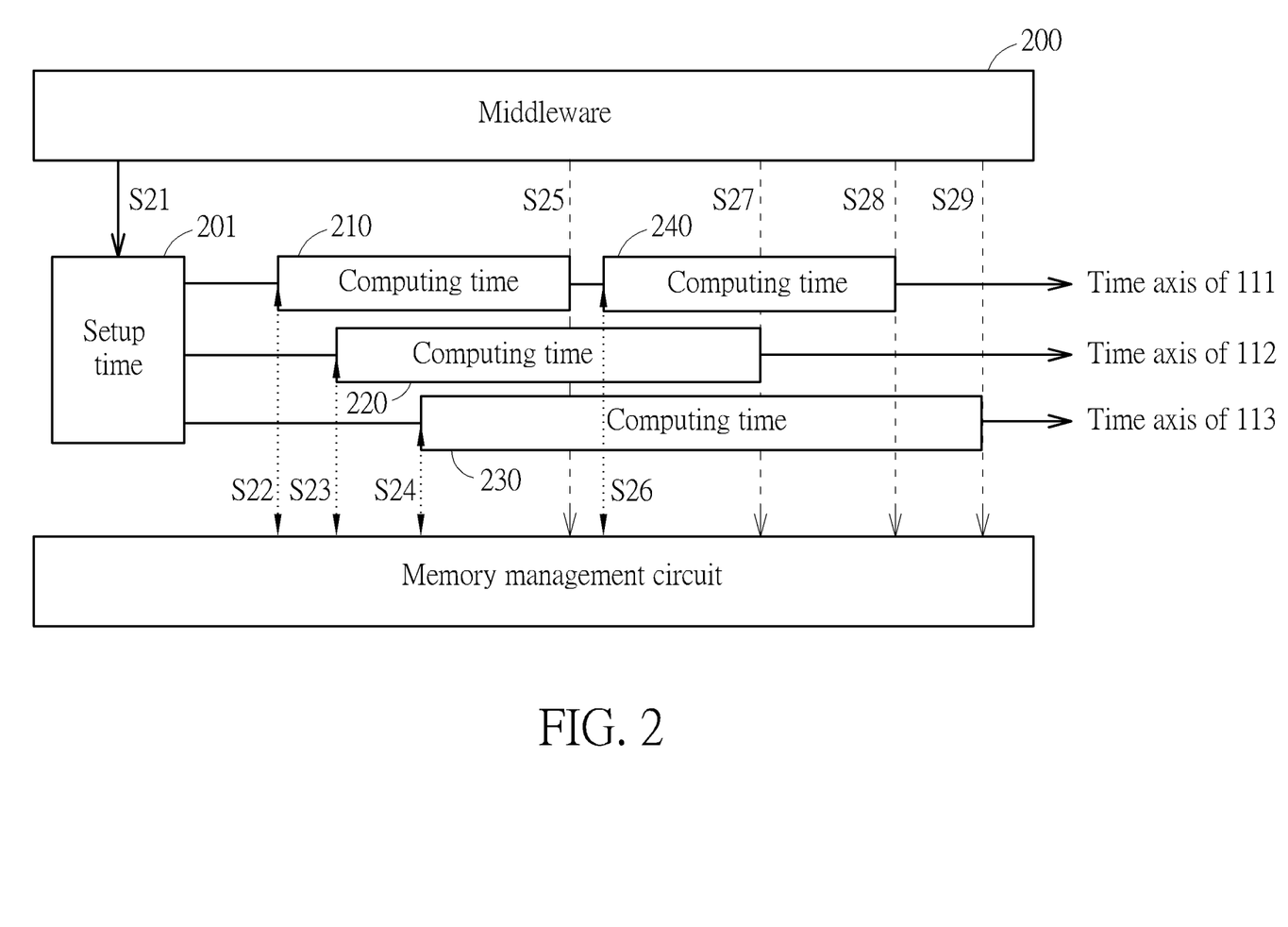
FIG. 2 is a diagram illustrating a control scheme of the electronic device shown in FIG. 1 according to an embodiment of the present invention.

FIG. 2 is a diagram illustrating a control scheme of the electronic device 10 shown in FIG. 1 according to an embodiment of the present invention. In this embodiment, an operation system of the electronic device 10 may control operations of hardware (e.g. the memory management circuit 100) within the electronic device 10 via a middleware 200, but the present invention is not limited thereto. As shown in FIG. 2, there are three horizontal axes, where a first horizontal axis may represent a time axis of operations of the accelerator 111 (labeled "Time axis of 111"), a second horizontal axis may represent a time axis of operations of the accelerator 112 (labeled "Time axis of 112"), and a third horizontal axis may represent a time axis of operations of the accelerator 113 (labeled "Time axis of 113").

In Step S21, the electronic device 10 is powered on, and the middleware 200 may activate a setup operation (e.g. pre-setting capacities of storage spaces of the TCM 121 for tasks to be executed) of the memory management circuit 100 during a setup time 201. It should be noted that the settings during the setup time 201 are virtual settings which considers capacity requirements of the tasks to be executed before execution of the tasks actually begins. For example, the setup operation may pre-set a first capacity, a second capacity, a third capacity and a fourth capacity of storage spaces of the TCM 121 for a first task, a second task, a third task and a fourth task, respectively. Note that the first capacity, the second capacity, the third capacity and the fourth capacity of storage spaces may be regarded as virtual settings, where a total capacity of the first capacity, the second capacity, the third capacity and the fourth capacity of storage spaces of the TCM 121 is not limited to be within a total capacity that is actually provided by the TCM 121. The memory management circuit 100 may establish mapping tables according to the storage spaces that are available at the moment of executing these tasks.

In Step S22, the accelerator 111 may start the first task (e.g. a computing operation which corresponds to a computing time 210) and request a first storage space via the memory management circuit 100, and the memory management circuit 100 may generate a first mapping table for the first task.

In Step S23, the accelerator 112 may start the second task (e.g. a computing operation which corresponds to a computing time 220) and request a second storage space via the memory management circuit 100, and the memory management circuit 100 may generate a second mapping table for the second task.

In Step S24, the accelerator 113 may start the third task (e.g. a computing operation which corresponds to a computing time 230) and request a third storage space via the memory management circuit 100, and the memory management circuit 100 may generate a third mapping table for the third task.

In Step S25, the accelerator 111 may complete the first task, and the middleware 200 may control the memory management circuit 100 to release the first storage space.

In Step S26, the accelerator 111 may start the fourth task (e.g. a computing operation which corresponds to a computing time 240) and request a fourth storage space via the memory management circuit 100, and the memory management circuit 100 may generate a fourth mapping table for the fourth task.

In Step S27, the accelerator 112 may complete the second task, and the middleware 200 may control the memory management circuit 100 to release the second storage space.

In Step S28, the accelerator 111 may complete the fourth task, and the middleware 200 may controls the memory management circuit 100 to release the fourth storage space.

In Step S29, the accelerator 113 may complete the third task, and the middleware 200 may control the memory management circuit 100 to release the third storage space.

Figure 3:
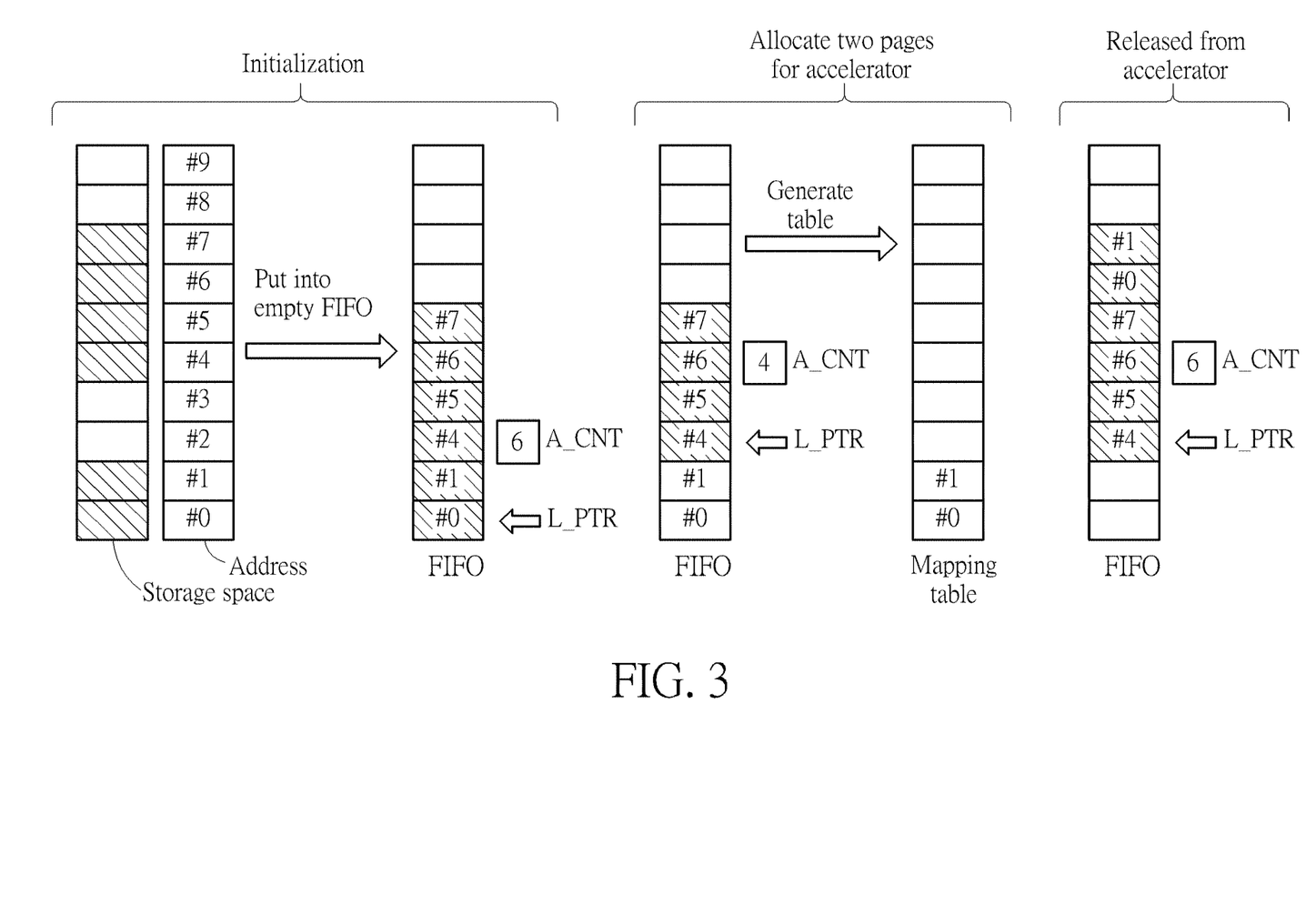
FIG. 3 is a diagram illustrating a control scheme of a memory management of a memory according to an embodiment of the present invention.

FIG. 3 is a diagram illustrating a control scheme of a memory management of a memory such as the TCM 121 shown in FIG. 1 according to an embodiment of the present invention. As shown in FIG. 1, the controller 130 (e.g. the initialization control circuit 134 therein) may start the initialization operation (labeled "Initialization" in FIG. 3 for brevity) after the electronic device 10 (e.g. the memory management circuit 100 therein) is powered on, where two arrays of boxes shown on a leftmost side of FIG. 3 may represent storage spaces (e.g. ten storage pages) of the TCM 121 and addresses thereof. For better illustration, it is assumed that the TCM 121 comprise ten storage spaces (e.g. ten storage pages), and #0 to #9 may represent ten addresses of the storage spaces (e.g. ten storage pages) of the TCM 121, respectively, but the present invention is not limited thereto. In this embodiment, the shaded boxes may represent storage spaces (e.g. storage pages) that are empty or available.

By performing the initialization operation mentioned above, the controller 130 may record the addresses #0, #1, #4, #5, #6 and #7 which corresponds to the storage spaces (e.g. storage pages) that are empty or available as the available TCM addresses, and the searching logic 131 may put these available TCM addresses into the FIFO storage device 140M that is empty (labeled "Put into empty FIFO") with the order of #0, #1, #4, #5, #6 and #7 as shown in FIG. 3. In this embodiment, the FIFO storage device 140M may comprise a plurality of storage units (which are illustrated by a plurality of boxes), and the storage units are configured to store the available TCM addresses, respectively. For better illustration, the FIFO storage device 140M may comprise ten storage units as illustrated by an array of ten boxes labeled "FIFO", but the present invention is not limited thereto. A box at a bottom of this array of ten boxes may be regarded as a first storage unit, and deduced by analogy, a box at a top of this array of ten boxes may be regarded as a tenth storage unit. Thus, the address #0 may be stored in the first storage unit of the FIFO storage device 140M, the address #1 may be stored in a second storage unit of the FIFO storage device 140M, the address #4 may be stored in a third storage unit of the FIFO storage device 140M, the address #5 may be stored in a fourth storage unit of the FIFO storage device 140M, the address #6 may be stored in a fifth storage unit of the FIFO storage device 140M, and the address #7 may be stored in a sixth storage unit of the FIFO storage device 140M. Based on this condition, the pointer L_PTR may be set to indicate that the FIFO storage device 140M may output at least one available TCM address starting from the first storage unit (which may be an example of the specific storage unit indicated by the pointer L_PTR) when the counting value A_CNT indicate a non-zero value (e.g. when at least one available TCM address exists). In this embodiment, the counting value A_CNT may indicate that the number of the available TCM addresses is six.

When any accelerator of the accelerators 111, 112 and 113 requests for a certain capacity of storage, the memory management circuit 100 may allocate a corresponding number of storage pages of the TCM 121 for this accelerator. For example, when the memory management circuit 100 allocates two storage pages of the TCM for a request (e.g. the storage request mentioned above) from any accelerator of the accelerators 111, 112 and 113 (labeled "Allocate two pages for accelerator" in FIG. 3 for brevity), the FIFO storage device 140M may output two available TCM addresses starting from the first storage unit (i.e. the specific storage unit indicated by the pointer L_PTR) of the FIFO storage device 140M. That is, the FIFO storage device 140M may output the addresses #0 and #1 for generating a mapping table (labeled "Generate table" in FIG. 3 for brevity), to allow this accelerator to utilize the storage pages corresponding to the addresses #0 and #1 according to this mapping table.

It should be noted that, after the FIFO storage device 140M outputs at least one available TCM address, the searching logic 131 may update the pointer L_PTR to indicate a subsequent storage unit among the storage units of the FIFO storage device 140M according to the number of the at least one available TCM address being output, in order to make the FIFO storage device 140M output a subsequent available TCM address of the available TCM addresses starting from the subsequent storage unit when a subsequent capacity of storage is requested. In detail, assuming that the specific storage unit is an $N^{th}$ storage unit among the storage units before any available TCM addresses is output, when the number of the at least one available TCM address being output is M, the subsequent storage unit (i.e. the specific storage unit indicated by the pointer L_PTR after being updated) is an $(N+M)^{th}$ storage unit among the storage units of the FIFO storage device 140M, wherein each of N and M is a positive integer. For example, specific storage unit indicated by the pointer L_PTR may be the first storage unit of the FIFO storage device 140M before the addresses #0 and #1 are output. After two available TCM addresses (e.g. the addresses #0 and #1) are output, the pointer L_PTR may be updated to indicate the third storage unit of the FIFO storage device 140M. Thus, if any of the accelerator 111, 112 and 113 further requests for subsequent capacity of storage after the addresses #0 and #1 are output, the FIFO storage device 140M may output at least one available TCM address starting from the third storage unit of the FIFO storage device 140M. In addition, after the FIFO storage device 140M output the at least one available TCM address, the searching logic 131 may update the counting value A_CNT to indicate a latest number of the available TCM addresses queued in the FIFO storage device 140M that are available according to the number of the at least one available TCM address being output. For example, after two available TCM addresses (e.g. the addresses #0 and #1) are output, the available TCM addresses remained in the FIFO storage device 140M comprise the addresses #4, #5, #6 and #7, and the searching logic 131 may update the counting value A_CNT to indicate that the number of the available TCM addresses becomes four (e.g. 6−2=4).

In addition, when at least one released storage space within the TCM 121 is released by any of the accelerator 111, 112 and 113, at least one released address associated with the at least one released storage space may be stored into at least one storage unit following a last one of the storage units respectively storing the available TCM addresses in the FIFO storage device 140M. For example, when the accelerator utilizing the storage pages corresponding to the addresses #0 and #1 finish its task, these storage pages can be released. When the storage pages corresponding to the addresses #0 and #1 within the TCM 121 are released by this accelerator (labeled "Released from accelerator" in FIG. 3 for brevity), the addresses #0 and #1 may be stored into the seventh storage unit and the eighth storage unit (i.e. the storage unit following the sixth storage unit storing the address #7), respectively. Thus, the available TCM addresses stored in the FIFO storage device 140M may be queued in an order of #4, #5, #6, #7, #0 and #1. In addition, the counting value A_CNT may be updated to indicate that the number of the available TCM addresses becomes six (e.g. 4+2=6).

It should be noted that the memory management circuit 100 (e.g. the searching logic 131 therein) may combine at least a portion of storage spaces of the TCM 121 and at least a portion of storage spaces of the DRAM 122 and accordingly generate one mapping table in response to a storage request for any of the accelerator 111, 112 and 113 (e.g. for the accelerator which sends this storage request) under a condition where available storage spaces of the TCM 121 are insufficient. For example, when the counting value A_CNT indicates that the available TCM addresses that are available are insufficient (which means available/empty storage pages within the TCM 121 are insufficient) to satisfy the specific capacity of storage requested by the computing circuit (e.g. when a capacity of eight storage pages of the TCM 121 is requested but the counting value A_CNT indicates that only six storage pages are available), the FIFO storage device 140M may output all of the available TCM addresses, and the searching logic 131 may generate the mapping table according to all of the available TCM addresses output from the FIFO storage device 140M and at least one address (e.g. at least one available DRAM address output from the FIFO storage device 140M or another storage device which is configured to store the available DRAM addresses) of the available storage spaces within the DRAM 122, to allow the address mapping logic 140 to redirect a logic address (which is a visualized address for the computing circuit) to a corresponding TCM address or a corresponding DRAM address.

In some embodiment, when the counting value A_CNT indicates that there is no available TCM addresses (e.g. all storage spaces within the TCM 121 are occupied), the FIFO storage device 140M may output at least one address (e.g. at least one available DRAM address) of the available storage spaces within the DRAM 122, or the searching logic 131 may obtain at least one available DRAM address from the storage device which is configured to store the available DRAM addresses). The searching logic 131 may generate the mapping table according to the at least one DRAM addresses output from the FIFO storage device 140M or the storage device storing the available DRAM addresses, to allow the address mapping logic 140 to redirect a logic address (which is a visualized address for the computing circuit) to a corresponding TCM address according to the mapping table.

In some embodiment, the accelerators 111, 112 and 113 may be set to have different priorities of being allocated storage resources of the TCM 121. For example, by software settings of the electronic device 10, only a portion of the accelerators 111, 112 and 113 have a permission of utilizing the storage resources of the TCM 121, where the others merely have a permission of utilizing the storage resources of the DRAM 122 and is unable to utilize the storage resources of the TCM 121. Thus, when a computing circuit without the permission of utilizing (e.g. accessing) the storage resources of the TCM 121 sends another storage request to request for a certain capacity of storage, the searching logic 131 may generate another mapping table according to the DRAM addresses only (no matter whether the counting value A_CNT indicates that the available storage spaces of the TCM 121 is sufficient or not), and the address mapping logic 140 may redirect this storage request from this computing circuit to the DRAM 122.

Figure 4:
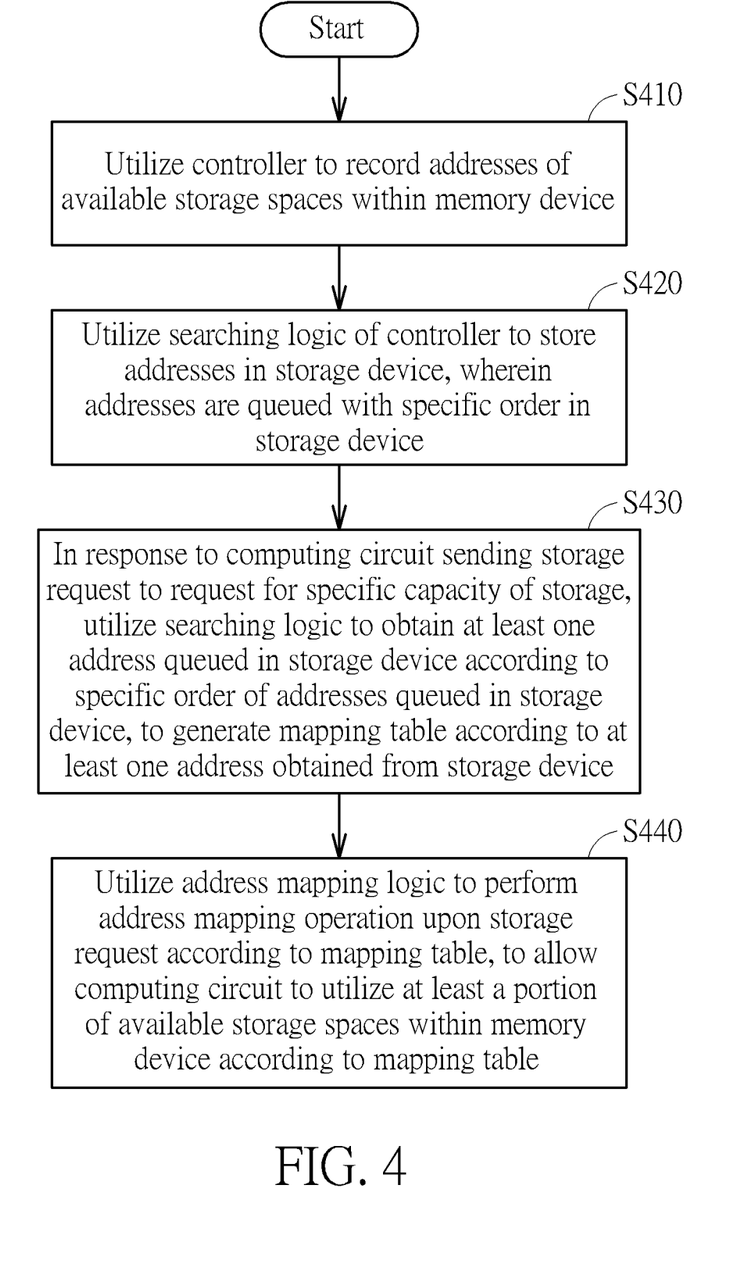
FIG. 4 is a diagram illustrating a working flow of a memory management method according to an embodiment of the present invention.

FIG. 4 is a diagram illustrating a working flow of a memory management method according to an embodiment of the present invention, where the memory management method is applicable to a memory management circuit such as the memory management circuit 100 shown in FIG. 1. It should be noted that the working flow shown in FIG. 4 is for illustrative purposes only, and is not meant to be a limitation of the present invention. For example, one or more steps may be added, deleted or modified in the working flow shown in FIG. 4. In addition, if a same result can be obtained, these steps do not have to be executed in the exact order shown in FIG. 4.

In Step S410, the memory management circuit may utilize a controller thereof (e.g. the controller 130 shown in FIG. 1) to record addresses (e.g. the available TCM addresses and/or the available DRAM addresses) of available storage spaces within a memory device (e.g. the TCM 121 and/or the DRAM 122).

In Step S420, the memory management circuit may utilize a searching logic (e.g. the searching logic 131 shown in FIG. 1) of the controller to store the addresses in a storage device (e.g. the FIFO storage device 140M), wherein the addresses (e.g. the available TCM addresses and/or the available DRAM addresses) are queued with a specific order in the storage device.

In Step S430, in response to a computing circuit (e.g. any of the accelerators 111, 112 and 113) sending a storage request to request for a specific capacity of storage, the memory management circuit may utilize the searching logic to obtain at least one address (e.g. at least one available TCM address and/or at least one available DRAM address) of the addresses queued in the storage device according to the specific order of the addresses queued in the storage device, to generate a mapping table according to the at least one address obtained from the storage device.

In Step S440, the memory management circuit may utilize an address mapping logic thereof (e.g. the address mapping logic 140 shown in FIG. 1) to perform an address mapping operation upon the storage request according to the mapping table, to allow the computing circuit to utilize at least a portion of the available storage spaces within the memory device according to the mapping table.

To summarize, the memory management circuit 100, the electronic device 10 (which comprises the memory management circuit 100) and the memory management method provided by the embodiments of the present invention can queue the available TCM addresses in the FIFO storage device 140M with the specific order. With this configuration, a searching operation for a task which requests for a storage resource of the TCM 121 merely needs to obtain a corresponding number of available TCM addresses from the FIFO storage device 140M to accordingly generate a corresponding mapping table, where a complexity of this searching operation will not increase even if available storage spaces of the TCM 121 becomes separated and irregular when time goes by. Thus, time for managing memory resources allocation can be fixed, rather than increasing in response to growth of a size of a memory (e.g. the TCM 121) and a usage condition of the memory. In addition, the embodiments of the present invention will not greatly increase additional costs. Thus, the present invention can reduce time complexity of memory management without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory management circuit, comprising:
a controller, configured to record first addresses of available storage spaces within a first memory device, and control operations of generating a mapping table in response to a storage request of a computing circuit, wherein the controller comprises:
  a searching logic circuit, configured to store the first addresses in a storage device and generate the mapping table, wherein the first addresses are queued with a specific order in the storage device;
  wherein when the computing circuit sends the storage request to request for a specific capacity of storage, the searching logic circuit obtains at least one first address of the first addresses queued in the storage device according to the specific order of the first addresses queued in the storage device, to generate the mapping table according to the at least one first address obtained from the storage device; and
an address mapping logic circuit, coupled to the controller, configured to perform an address mapping operation upon the storage request according to the mapping table, to allow the computing circuit to utilize at least a portion of the available storage spaces within the first memory device according to the mapping table;
wherein the storage device is a first in first out (FIFO) storage device comprising a plurality of storage units, the storage units are configured to store the first addresses, respectively, and the searching logic circuit further comprises:
  at least one register, configured to store a pointer which indicates a specific storage unit among the storage units;
  wherein the storage device outputs the at least one first address starting from the specific storage unit indicated by the pointer, after the storage device outputs the at least one first address, the searching logic circuit updates the pointer to indicate a subsequent storage unit among the storage units according to a number of the at least one first address being output, in order to make the storage device output a subsequent first address of the first addresses starting from the subsequent storage unit when a subsequent capacity of storage is requested, the specific storage unit is an $N^{th}$ storage unit among the storage units, the number of the at least one first address being output is M, and the subsequent storage unit is an $(N+M)^{th}$ storage unit among the storage units, wherein each of N and M is a positive integer.

2. The memory management circuit of claim 1, wherein the controller further comprises:
an initialization control circuit, configured to perform an initialization operation to determine the available storage spaces within the first memory device and thereby record the first addresses of the available storage spaces when the memory management circuit is powered on.

3. The memory management circuit of claim 1, wherein when at least one released storage space within the first memory device is released by the computing circuit, at least one released address associated with the at least one released storage space is stored into at least one storage unit following a last one of the storage units respectively storing the first addresses.

4. The memory management circuit of claim 1, wherein the searching logic circuit further comprises:
at least one register, configured to store a counting value which indicates a number of the first addresses that are available.

5. The memory management circuit of claim 4, wherein after the storage device outputs the at least one first address, the searching logic circuit updates the counting value to indicate a latest number of the first addresses that are available according to a number of the at least one first address being output.

6. The memory management circuit of claim 4, wherein when the counting value indicates that the first addresses that are available are insufficient to satisfy the specific capacity of storage requested by the computing circuit, the searching logic circuit generates the mapping table according to all of the first addresses output from the storage device and at least one second address of available storage spaces within a second memory device.

7. The memory management circuit of claim 1, wherein when another computing circuit without a permission of accessing the first memory device sends another storage request to request for another specific capacity of storage, the searching logic circuit generates another mapping table according to at least one second address of available storage spaces within a second memory device.

8. An electronic device, comprising:
a computing circuit, configured to perform a computing operation;
a memory device, configured to provide available storage spaces for the computing circuit during the computing operation; and
a memory management circuit, coupled to the computing circuit and the memory device, comprising:
  a controller, configured to record first addresses of the available storage spaces within the memory device, and control operations of generating a mapping table in response to a storage request of the computing circuit, wherein the controller comprises:
    a searching logic circuit, configured to store the first addresses in a storage device and generate the mapping table, wherein the first addresses are queued with a specific order in the storage device;
    wherein when the computing circuit sends the storage request to request for a specific capacity of storage, the searching logic circuit obtains at least one first address of the first addresses queued in the storage device according to the specific order of the first addresses queued in the storage device, to generate the mapping table according to the at least one first address obtained from the storage device; and
  an address mapping logic circuit, coupled to the controller, configured to perform an address mapping operation upon the storage request according to the mapping table, to allow the computing circuit to utilize at least a portion of the available storage spaces within the memory device according to the mapping table;
wherein the storage device is a first in first out (FIFO) storage device comprising a plurality of storage units, the storage units are configured to store the first addresses, respectively, and the searching logic circuit further comprises:
    at least one register, configured to store a pointer which indicates a specific storage unit among the storage units;
    wherein the storage device outputs the at least one first address starting from the specific storage unit indicated by the pointer, after the storage device outputs the at least one first address, the searching logic circuit updates the pointer to indicate a subsequent storage unit among the storage units according to a number of the at least one first address being output, in order to make the storage device output a subsequent first address of the first addresses starting from the subsequent storage unit when a subsequent capacity of storage is requested, the specific storage unit is an $N^{th}$ storage unit among the storage units, the number of the at least one first address being output is M, and the subsequent storage unit is an $(N+M)^{th}$ storage unit among the storage units, wherein each of N and M is a positive integer.

9. A memory management method, applicable to a memory management circuit, comprising:
    utilizing a controller of the memory management circuit to record first addresses of available storage spaces within a first memory device;
    utilizing a searching logic of the controller to store the first addresses in a storage device, wherein the first addresses are queued with a specific order in the storage device;
    in response to a computing circuit sending a storage request to request for a specific capacity of storage, utilizing the searching logic to obtain at least one first address of the first addresses queued in the storage device according to the specific order of the first addresses queued in the storage device, to generate a mapping table according to the at least one first address obtained from the storage device; and
    utilizing an address mapping logic of the memory management circuit to perform an address mapping operation upon the storage request according to the mapping table, to allow the computing circuit to utilize at least a portion of the available storage spaces within the first memory device according to the mapping table;
    wherein the storage device is a first in first out (FIFO) storage device comprising a plurality of storage units, the storage units are configured to store the first addresses, respectively, and utilizing the searching logic to obtain the at least one first address of the first addresses queued in the storage device according to the specific order of the first addresses queued in the storage device comprises:
        utilizing at least one register of the searching logic to store a pointer which indicates a specific storage unit among the storage units;
        utilizing the storage device to output the at least one first address starting from the specific storage unit indicated by the pointer; and
        after the storage device outputs the at least one first address, utilizing the searching logic to update the pointer to indicate a subsequent storage unit among the storage units according to a number of the at least one first address being output, in order to make the storage device output a subsequent first address of the first addresses starting from the subsequent storage unit when a subsequent capacity of storage is requested;
    wherein the specific storage unit is an $N^{th}$ storage unit among the storage units, the number of the at least one first address being output is M, and the subsequent storage unit is an $(N+M)^{th}$ storage unit among the storage units, wherein each of N and M is a positive integer.

10. The memory management method of claim 9, wherein utilizing the controller of the memory management circuit to record the first addresses of the available storage spaces within the first memory device comprises:
    utilizing an initialization control circuit of the controller to perform an initialization operation to determine the available storage spaces within the first memory device and thereby record the first addresses of the available storage spaces when the memory management circuit is powered on.

11. The memory management circuit of claim 9, further comprising:
    in response to at least one released storage space within the first memory device being released by the computing circuit, storing at least one released address associated with the at least one released storage space into at least one storage unit following a last one of the storage units respectively storing the first addresses.

12. The memory management method of claim 9, further comprising:
    utilizing at least one register of the searching logic to store a counting value which indicates a number of the first addresses that are available.

13. The memory management method of claim 12, further comprising:
    after the storage device outputs the at least one first address, utilizing the searching logic to update the counting value to indicate a latest number of the first addresses that are available according to a number of the at least one first address being output.

14. The memory management method of claim 12, further comprising:
    in response to the counting value indicating that the first addresses that are available are insufficient to satisfy the specific capacity of storage requested by the computing circuit, utilizing the searching logic to generate the mapping table according to all of the first addresses output from the storage device and at least one second address of available storage spaces within a second memory device.

15. The memory management method of claim 9, further comprising:
    in response to another computing circuit without a permission of accessing the first memory device sending another storage request to request for another specific capacity of storage, utilizing the searching logic to generate another mapping table according to at least one second address of available storage spaces within a second memory device.

\* \* \* \* \*